(12) United States Patent
Himmelmann

(10) Patent No.: US 11,827,341 B2
(45) Date of Patent: Nov. 28, 2023

(54) THIN-SKIN SIDE STAY BEAMS AND LANDING GEAR ASSEMBLIES

(71) Applicant: Goodrich Corporation, Charlotte, NC (US)

(72) Inventor: Richard A. Himmelmann, Beloit, WI (US)

(73) Assignee: GOODRICH CORPORATION, Charlotte, NC (US)

( * ) Notice: Subject to any disclaimer, the term of this patent is extended or adjusted under 35 U.S.C. 154(b) by 700 days.

(21) Appl. No.: 16/563,419

(22) Filed: Sep. 6, 2019

(65) Prior Publication Data

US 2020/0018345 A1     Jan. 16, 2020

Related U.S. Application Data

(62) Division of application No. 15/222,772, filed on Jul. 28, 2016, now Pat. No. 10,563,690.

(51) Int. Cl.
| | |
|---|---|
| *F16C 7/02* | (2006.01) |
| *B64C 25/10* | (2006.01) |
| *B23K 15/00* | (2006.01) |
| *B23K 9/04* | (2006.01) |
| *B22F 5/10* | (2006.01) |
| *B22F 3/105* | (2006.01) |
| *B22F 3/10* | (2006.01) |

(Continued)

(52) U.S. Cl.
CPC ............ *B64C 25/12* (2013.01); *B22F 3/1017* (2013.01); *B22F 5/106* (2013.01); *B22F 10/20* (2021.01); *B23K 9/044* (2013.01); *B23K 15/0086* (2013.01); *B23K 26/342* (2015.10); *B33Y 10/00* (2014.12); *B33Y 80/00* (2014.12); *B64C 25/10* (2013.01); *B64C 25/20* (2013.01); *F16C 7/02* (2013.01); *B22F 2998/10* (2013.01); *B23K 2101/06* (2018.08)

(58) Field of Classification Search
CPC .................................. F16C 7/02; B33Y 10/00
See application file for complete search history.

(56) References Cited

U.S. PATENT DOCUMENTS

| | | |
|---|---|---|
| 2,395,690 A | 2/1946 | Sherman |
| 2,441,871 A | 6/1947 | Herbert |

(Continued)

FOREIGN PATENT DOCUMENTS

| | | |
|---|---|---|
| CN | 105109637 | 12/2015 |
| WO | WO2015053940 | 4/2015 |

OTHER PUBLICATIONS

Extended European Search Report dated Nov. 28, 2017 in Application 17174624.1.

(Continued)

*Primary Examiner* — Anthony M Liang
(74) *Attorney, Agent, or Firm* — SNELL & WILMER L.L.P.

(57) ABSTRACT

A thin-skin side-stay beam may include an upper arm with thin skin and a mating flange extending longitudinally from the thin skin. A lower arm may also have a thin skin and a mating flange extending longitudinally from the lower arm. A joint may include a pin and/or a bushing extending through the mating flanges to pivotally couple the upper arm to the lower arm. The upper arm and/or the lower arm may include one or more internal walls defining one or more internal cavities.

3 Claims, 10 Drawing Sheets

(51) Int. Cl.
   *B23K 26/342* (2014.01)
   *B33Y 80/00* (2015.01)
   *B33Y 10/00* (2015.01)
   *B64C 25/12* (2006.01)
   *B64C 25/20* (2006.01)
   *B22F 10/20* (2021.01)
   *B23K 101/06* (2006.01)

(56) References Cited

U.S. PATENT DOCUMENTS

| | | |
|---|---|---|
| 4,433,820 A | 2/1984 | Turiot |
| 6,349,901 B1 | 2/2002 | Grossman |
| 8,490,914 B2 | 7/2013 | Chow et al. |
| 2002/0152715 A1 * | 10/2002 | Rotheroe .................. E04C 3/32 52/855 |
| 2007/0007386 A1 | 1/2007 | Coupe |
| 2013/0112309 A1 | 5/2013 | Stewart |
| 2015/0034762 A1 | 2/2015 | Reber |
| 2015/0239553 A1 | 8/2015 | Leclercq |

OTHER PUBLICATIONS

Restriction Requirement office Action dated Jul. 5, 2018 in U.S. Appl. No. 15/222,772.
Non-Final Office Action dated Oct. 1, 2018 in U.S. Appl. No. 15/222,772.
Ex Parte Quayle Action dated Apr. 17, 2019 in U.S. Appl. No. 15/222,772.
Notice of Allowance dated Jun. 11, 2019 in U.S. Appl. No. 15/222,772.

* cited by examiner

THIN-SKIN SIDE STAY BEAMS AND LANDING GEAR ASSEMBLIES

CROSS REFERENCE TO RELATED APPLICATIONS

This application is a divisional of, claims priority to and the benefit of, U.S. patent application Ser. No. 15/222,772, filed on Jul. 28, 2016, and entitled "THIN-SKIN SIDE STAY BEAMS AND LANDING GEAR ASSEMBLIES," which is incorporated by reference in its entirety.

FIELD

The disclosure relates generally to aircraft landing gear, with various embodiments relating to thin-skinned landing gear structures.

BACKGROUND

Aircraft designers have continuously tried to increase the fuel efficiency of aircraft over the last century. The fuel efficiency of an aircraft may be related to the aircraft's mass and aerodynamic drag. In addition, noise regulations for aircraft at low altitudes encourage reduction of the aircraft's noise signature while it is near the ground. Landing gear can be heavy and aerodynamically resistant. Additionally, deployed landing gear may increase the noise signature of an aircraft as a result of air rushing past the deployed gear.

SUMMARY

A thin-skin side-stay beam is provided. The side-stay beam may include an upper arm with thin skin and a mating flange extending longitudinally from the thin skin. A lower arm may also have a thin skin and a mating flange extending longitudinally from the lower arm. A joint may include a pin and/or a bushing extending through the mating flanges to pivotally couple the upper arm to the lower arm.

In various embodiments, the upper arm may have an internal wall extending longitudinally within the thin skin. The internal wall and the thin skin may define an internal cavity having a triangular geometry. The first internal wall may be substantially flat. The triangular geometry may also be convex along the thin skin. A curved surface may blend the first internal wall into the thin skin. The upper arm may also have a second internal wall extending longitudinally within the thin skin. The first internal wall, the second internal wall, and the thin skin may define a second internal cavity having a rectangular geometry. The second internal wall and the thin skin may define a third internal cavity with a triangular geometry. The thin skin may vary in thickness from about 0.07 inches to about 0.125 inches. The upper arm and the lower arm may be made using wire arc additive manufacturing (WAAM) and/or electron beam additive manufacturing (EBAM).

An arm of a thin-skin side-stay beam is also provided. The arm may include a thin skin elongated in a longitudinal direction. A first mating flange may extend from a first longitudinal end of the thin skin. A second mating flange may also extend from a second longitudinal end of the thin skin. A first internal wall may extend longitudinally within the thin skin. The thin skin and the first internal wall may define a first triangular cavity. A second internal wall may extend longitudinally within the thin skin. The thin skin, the first internal wall, and the second internal wall may define a rectangular cavity. The thin skin and the second internal wall may further define a second triangular cavity.

In various embodiments, the thin skin may have a thickness ranging from about 0.07 inches to about 0.125 inches. The first inner wall may have a thickness ranging from about 0.025 inches to about 0.25 inches. The first inner wall may also be blended into the thin skin by a curved surface. The curved surface may have a radius of curvature ranging from about 0.5 inches to about 0.8 inches. The first inner wall may be aligned longitudinally with the first mating flange and the second mating flange. The arm may be tapered with the height at the first longitudinal end greater than the height at the second longitudinal end.

A method of making an arm for a thin-skin side stay is also provided. The method may include the steps of selecting a metal, and forming a thin skin of the arm from the metal using additive manufacturing. The arm may include an internal wall, and the arm may define a plurality of internal cavities.

In various embodiments, forming the thin-skin of the arm may include depositing a first layer of the metal, removing an excess material from the first layer of the metal, and depositing a second layer of the metal over the first layer of the metal. The method may also include depositing a first layer of the metal, depositing a second layer of the metal over the first layer of the metal, and removing an excess material from the first layer of the metal and the second layer of the metal. The internal wall and arm may define a cavity from the plurality of cavities having a triangular geometry.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates to landing gear assemblies having aerodynamic thin-skin side-stay beams. Landing gear assemblies may have reduced weight and improved stress distribution by using a hollow-bodied, thin-skin support members and/or side-stays to support the aircraft. This thin-skin design uses thin-skin construction, similar to wing design, to distribute load forces along a greater surface area and thereby enable a reduced cross-section area construction, which reduces the overall mass of the landing gear. Various embodiments of the disclosure provide a smooth, aerodynamic structure, which tends to reduce drag and noise production due to aerodynamic buffeting.

Figure 1B:
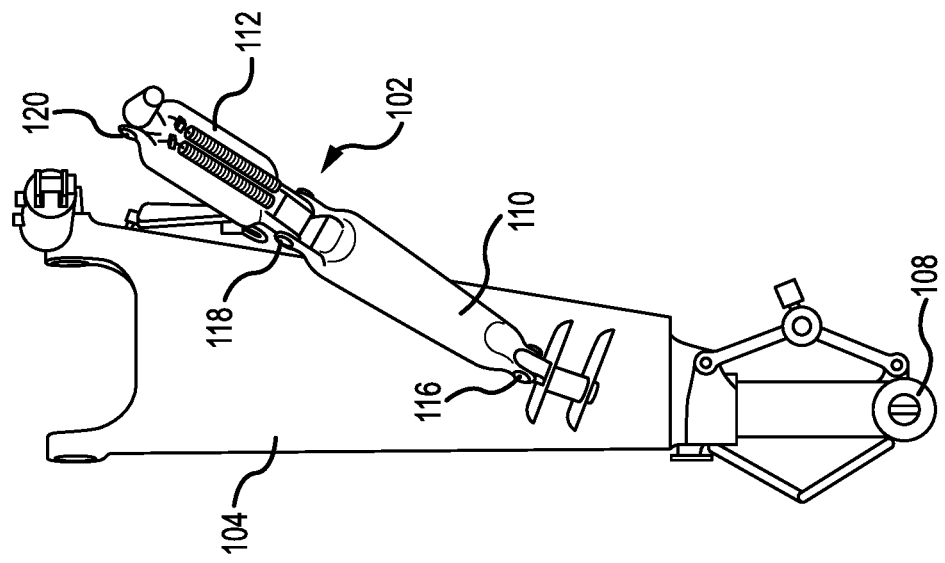
FIG. 1B illustrates a side view of a thin skin landing gear assembly, in accordance with various embodiments.
Figure 1A:
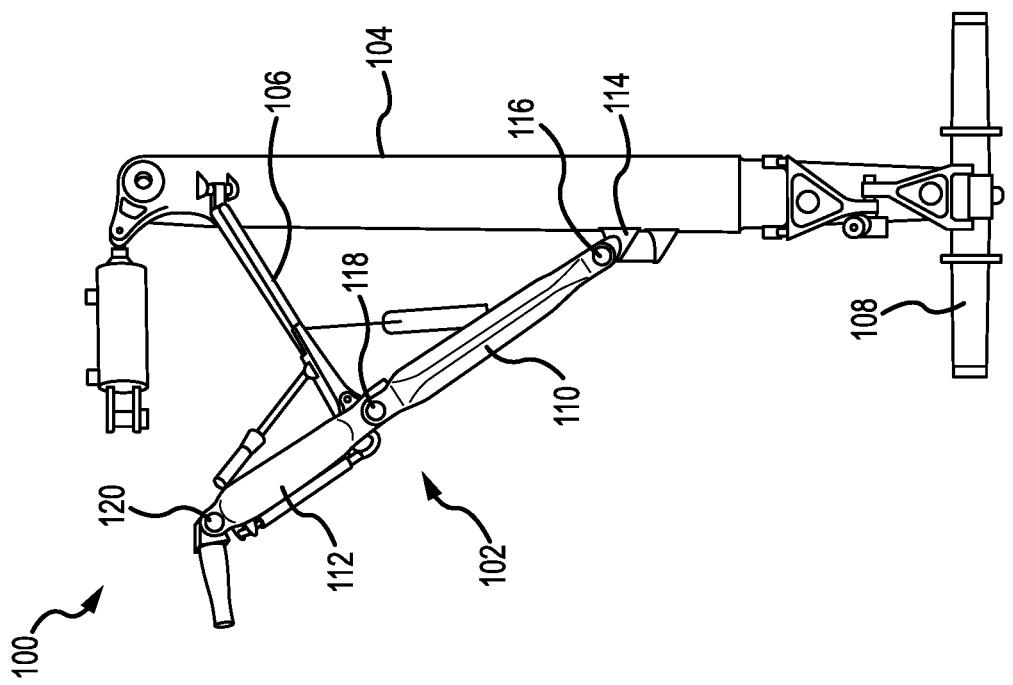
FIG. 1A illustrates a front view of a thin skin landing gear assembly, in accordance with various embodiments.

Referring now to FIGS. 1A and 1B, an exemplary landing gear assembly 100 is shown having a thin-skin side-stay beam 102 and thin-skin support member 104, in accordance with various embodiments. Thin-skin side-stay beam 102 may be pivotally coupled to linkage 106, which is further pivotally coupled to thin-skin support member 104. Thin-skin side-stay beam 102 may also comprise lower arm 110 that is pivotally coupled to mounting point 114 of thin-skin support member 104 by joint 116. Lower arm 110 may also be pivotally coupled to upper arm 112 of thin-skin side-stay beam 102 by joint 118. In that regard, thin-skin side-stay beam 102 may comprise an upper arm 112 coupled to a lower arm 110 with upper arm 112 being longer than upper arm 112. Upper arm 112 may further be pivotally coupled to an interface structure at joint 120.

In various embodiments, an axle 108 may be coupled to thin-skin support member 104 in a perpendicular manner and may be configured to support a rotating wheel assembly. Thin-skin side-stay beam 102 may provide support for thin-skin support member 104 and thereby limit motion of thin-skin support member 104 relative to an aircraft in response to landing gear assembly 100 being fully deployed. Thin-skin side-stay beam 102 may also provide a pulling force on thin-skin support member 104 at joint 116 and mounting point 114 to stow landing gear assembly 100.

Figure 2A:
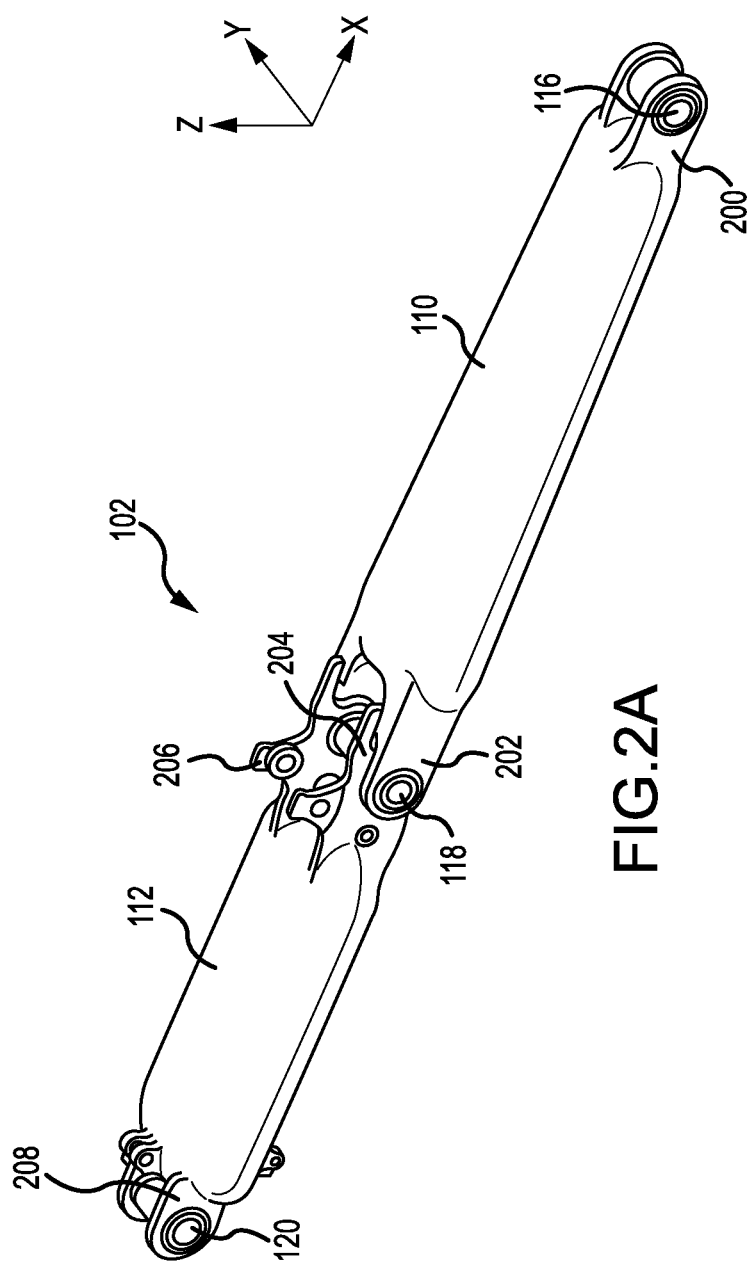
FIG. 2A illustrates a perspective view of a side-stay assembly having a thin-skin architecture, in accordance with various embodiments.

With reference to FIG. 2A, a perspective view of thin-skin side-stay beam 102 is shown, in accordance with various embodiments. Lugs 200 may extend longitudinally (with length defined in the x direction, width defined in the y direction, and height defined in the z direction) from lower arm 110. Joint 116 may include a bushing or pin passed through an opening defined in lugs 200 that have a substantially parallel orientation to one another. Mating flanges 202 may extend longitudinally from lower arm 110 from the side opposite lugs 200. Joint 118 may include a pin or bushing passed through openings defined in mating flanges 202 of lower arm 110 as well as through openings defined in mating flanges 204 extending longitudinally from upper arm 112. Lugs 208 may extend longitudinally from upper arm 112 towards joint 120 for pivotal coupling using a pin and/or bushing. Mating tabs 206 may extend from mating flange 204 and/or upper arm 112 to define openings for coupling to linkage 106 of FIG. 1.

Figure 2B:
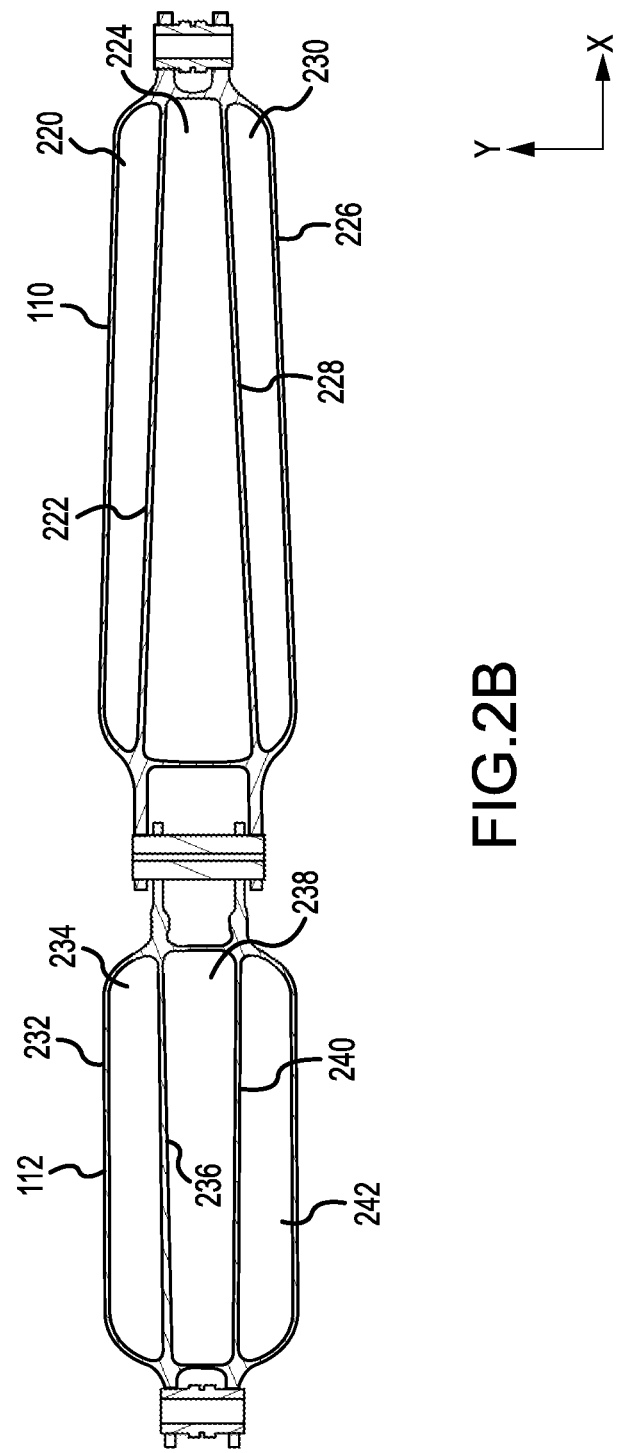
FIG. 2B illustrates a cross-sectional view of a side-stay assembly having a thin-skin architecture and longitudinally oriented internal walls, in accordance with various embodiments.
Figure 3A:
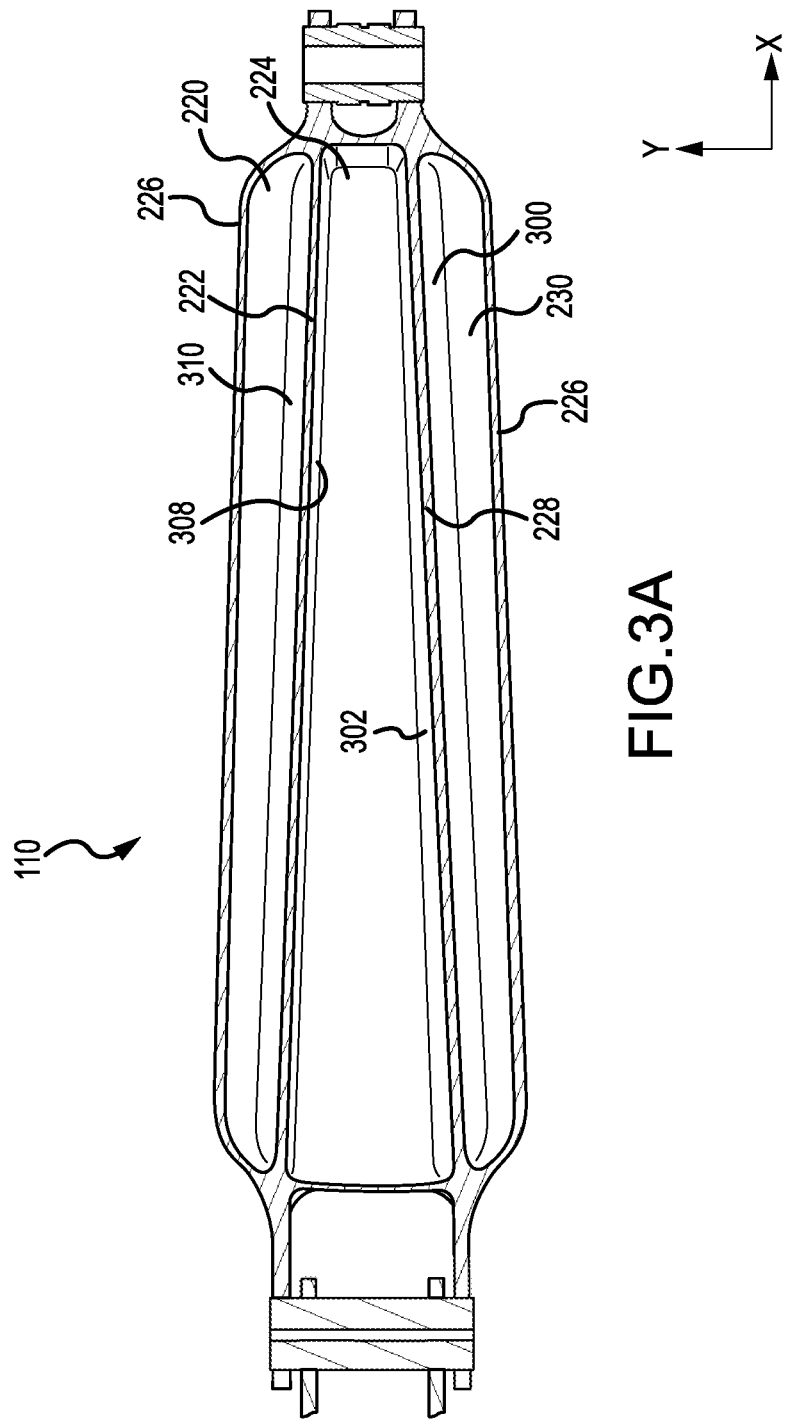
FIG. 3A illustrates a cross-sectional view of a lower arm having internal cavities and longitudinally oriented internal walls, in accordance with various embodiments.
Figure 4A:
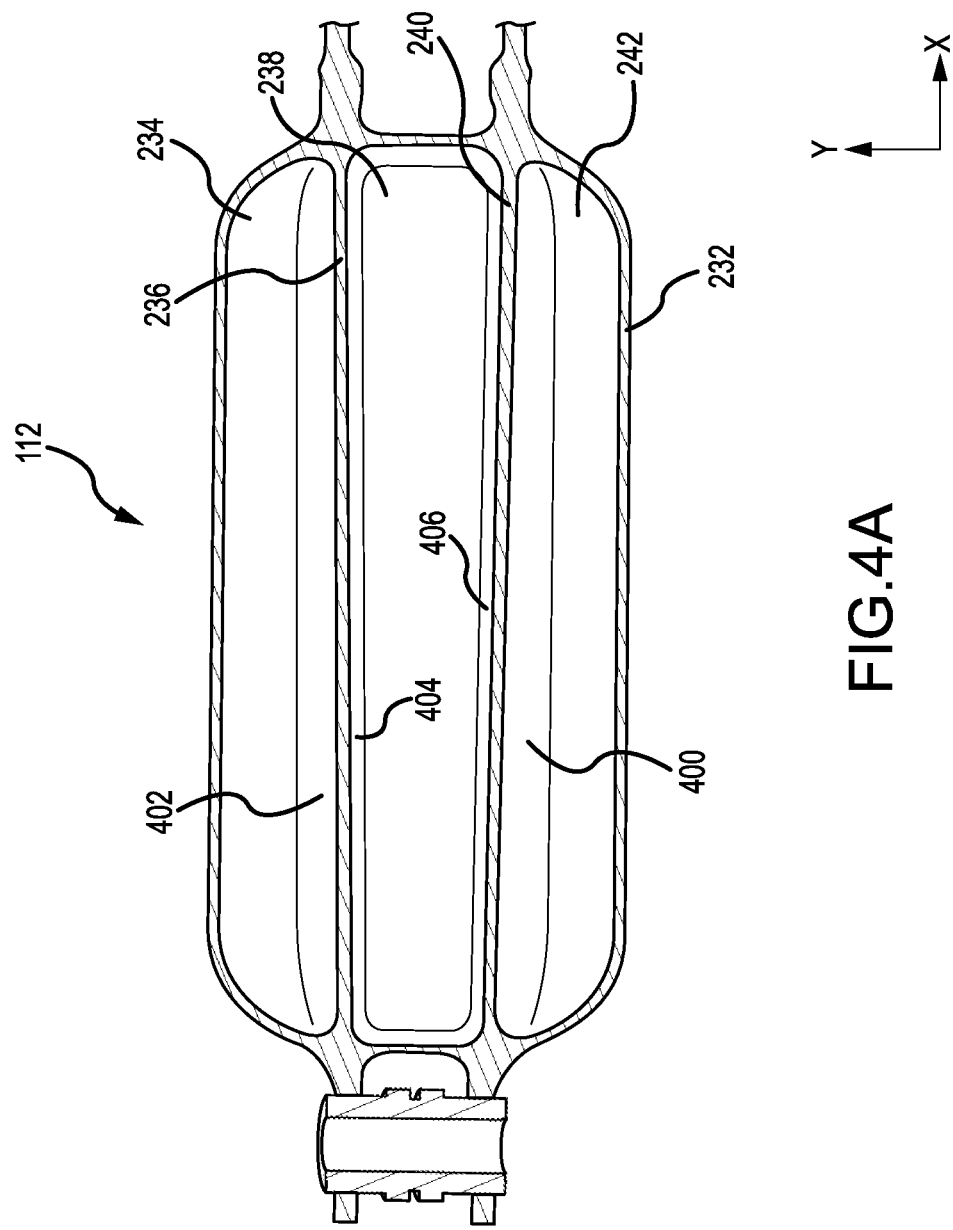
FIG. 4A illustrates a cross-sectional view of a upper arm having internal cavities and longitudinally oriented internal walls, in accordance with various embodiments.

Referring now to FIGS. 2B, 3A, and 4A, cross-sectional views of thin-skin side-stay beam 102 are shown, in accordance with various embodiments. Both upper arm 112 and lower arm 110 of thin-skin side-stay beam 102 may include hollow internal passages at least partially defined by internal support walls.

In various embodiments, lower arm 110 has a thin skin 226 defining its outer surface and partially defining internal cavity 220, internal cavity 224, and internal cavity 230. The outer surface of lower arm and thin skin 226 may be smooth. The outer surface may comprise a tightly-curved leading edge and a less curved side surface for an aerodynamic geometry when the arm is deployed and exposed to wind. Thin skin 226 may vary in thickness from about 60 mils (1.5 mm) to about 400 mils (10.2 mm), from about 70 mils (1.8 mm) to about 125 mils (3.2 mm), or from about 50 mils (1.3 mm) to 500 mils (12.7 mm), or from about 40 mils (1.0 mm) to 600 mils (15.2 mm). As used herein, a mil refers to a thousandth of an inch. Thin skin 226 of lower arm 110 is thus typically less than about 400 mils (10.2 mm) thick, with greater thicknesses used to support greater airframe loads. Lower wall thicknesses for thin skin 226 tend to minimize the weight of thin-skin side-stay beam 102. The thickness circumferentially around lower arm 110 may be substantially uniform at a given longitudinal location along the x axis. Thin skin 226 may also be thicker at the longitudinal ends of lower arm 110 (near lugs 200 and mating flanges 202) and thinner at the longitudinal midpoint of lower arm 110.

In various embodiments, lower arm 110 may include internal wall 222 and internal wall 228. Internal wall 222 and internal wall 228 may have reflective symmetry. The internal walls may also be non-parallel, with the ends of internal wall 222 and internal wall 228 aligning with lugs 200 and mating flanges 202, both of FIG. 2A. Internal cavity 220 may thus be defined by thin skin 226 and internal wall 222. Internal cavity 230 may be defined by thin skin 226 and internal wall 228. Internal cavity 224 may be defined by thin skin 226, internal wall 222, and internal wall 228. Internal walls may vary in thickness similar to the above described thicknesses of thin skin 226. Additionally, internal walls may have a thickness greater than thin skin 226 in some locations. For example, internal wall 222 and internal wall 228 may have a thickness ranging from about 125 mils (3.2 mm) to 250 mils (6.4 mm).

In various embodiments, upper arm 112 has a thin skin 232 defining its outer surface and partially defining internal cavity 234, internal cavity 238, and internal cavity 242. Thin skin 232 may vary in thickness from about 70 mils (1.8 mm) to about 125 mils (3.2 mm), or from about 60 mils (1.5 mm) to about 400 mils (10.2 mm), from about 50 mils (1.3 mm) to 500 mils (12.7 mm), or from about 40 mils (1.0 mm) to 600 mils (15.2 mm). Thin skin 232 of upper arm 112 is thus typically less than about 400 mil (10.2 mm) thick, with greater thicknesses used to support greater airframe loads. Lower wall thicknesses for thin skin 232 tend to minimize the weight of thin-skin side-stay beam 102. The thickness around upper arm 112 may be substantially uniform at a given longitudinal location along the x axis. Thin skin 232 may be thicker at the longitudinal ends of upper arm 112 (near lugs 208 and mating flanges 204) and thinner at the longitudinal midpoint of upper arm 112.

In various embodiments, upper arm 112 may include internal wall 236 and internal wall 240. Internal wall 236 and internal wall 240 may have reflective symmetry. The internal walls may also be non-parallel, with the ends of internal wall 236 and internal wall 240 aligning with lugs 208 and mating flanges 204, both of FIG. 2A. Internal cavity 234 may thus be defined by thin skin 232 and internal wall 236. Internal cavity 242 may be defined by thin skin 232 and internal wall 240. Internal cavity 238 may be defined by thin skin 232, internal wall 236, and internal wall 240. Internal walls may vary in thickness similar to the above described thicknesses of thin skin 232. Additionally, internal walls may have a thickness greater than thin skin 232 in some locations. For example, internal wall 236 and internal wall 240 may have a thickness ranging from about 125 mils (3.2 mm) to 250 mils (6.4 mm).

Referring now to FIG. 3A, the thickness of internal wall 222 and internal wall 228 may vary along the length (i.e., in the x direction) of lower arm 110 and the radius of curvature of the surface joining internal wall 222 with thin skin 226, or internal wall 228 with thin skin 226, may vary as well. Curved surface 300 may extend along the length of internal wall 228 and may blend a surface of internal wall 228 into the internal surface of thin skin 226. Curved surface 302 may also run along the length of internal wall 228 and may blend a surface of internal wall 228 into the internal surface of thin skin 226. The curve of the curved surface may include a radial, multi-radial, oriented perpendicular to the length of internal wall 228 (i.e., in the y-z plane of FIG. 2A). The radius of curvature may vary at different longitudinal points along the length of lower arm 110.

In various embodiments, curved surface 308 may be symmetric to curved surface 302. Similarly, curved surface 300 may be symmetric to curved surface 310. Curved surface 302 and curved surface 308 may have a radius of curvature ranging from 0.5 inches (12.7 mm) to 0.8 inches (20.3 mm). In various embodiments, the radius of curvature of curved surface 308 and curved surface 302 may be may be shorter near the longitudinal center of lower arm 110 than the radius of curvature near the longitudinal ends of lower arm 110. Curved surface 300 and curved surface 310 may have a substantially uniform curvature of approximately 0.5 inches (12.7 mm), or ranging from 0.5 inches (12.7 mm) to 0.8 inches (20.3 mm).

Figure 3B:
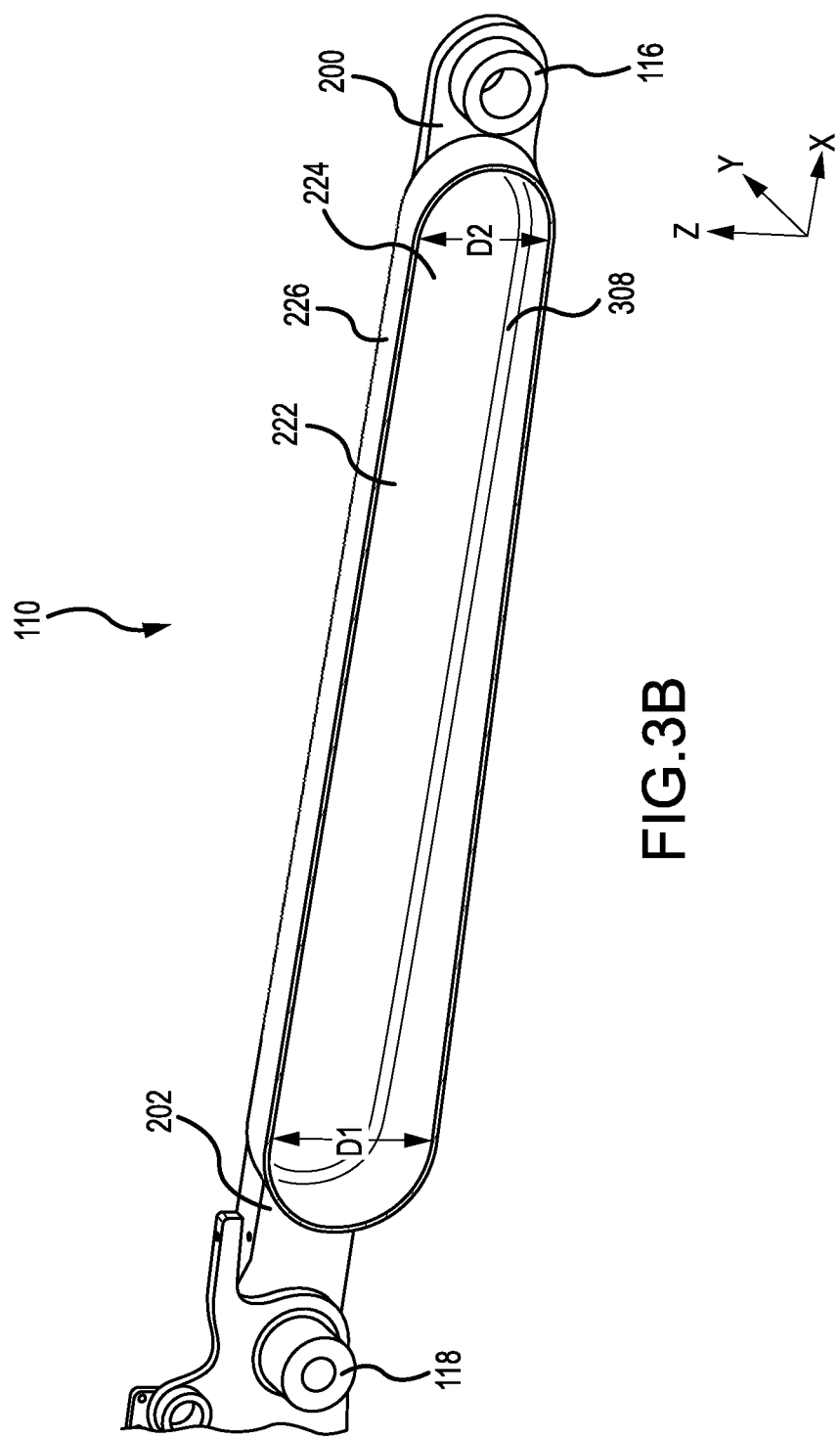
FIG. 3B illustrates a cross sectional view of a central cavity of a lower arm partially defined by internal walls, in accordance with various embodiments.

With reference to FIG. 3B, a cross sectional view of lower arm 110 taken along the x-z plane is shown, in accordance with various embodiments. Lower arm 110 may have a height $D_1$ (in the z direction) proximate joint 118 and mating flange 202. Lower arm 110 may also have a height $D_2$ (in the z direction) proximate joint 116 and lug 200. Lower arm 110 and internal cavity 224 may have a tapered height in the longitudinal direction, with $D_1$ greater than $D_2$. In that regard, thin skin 226 may define two non-parallel longitudinal walls when viewed in cross section as shown in FIG. 2B. Curved surface 308 may define a perimeter of internal wall 222.

Figure 3C:
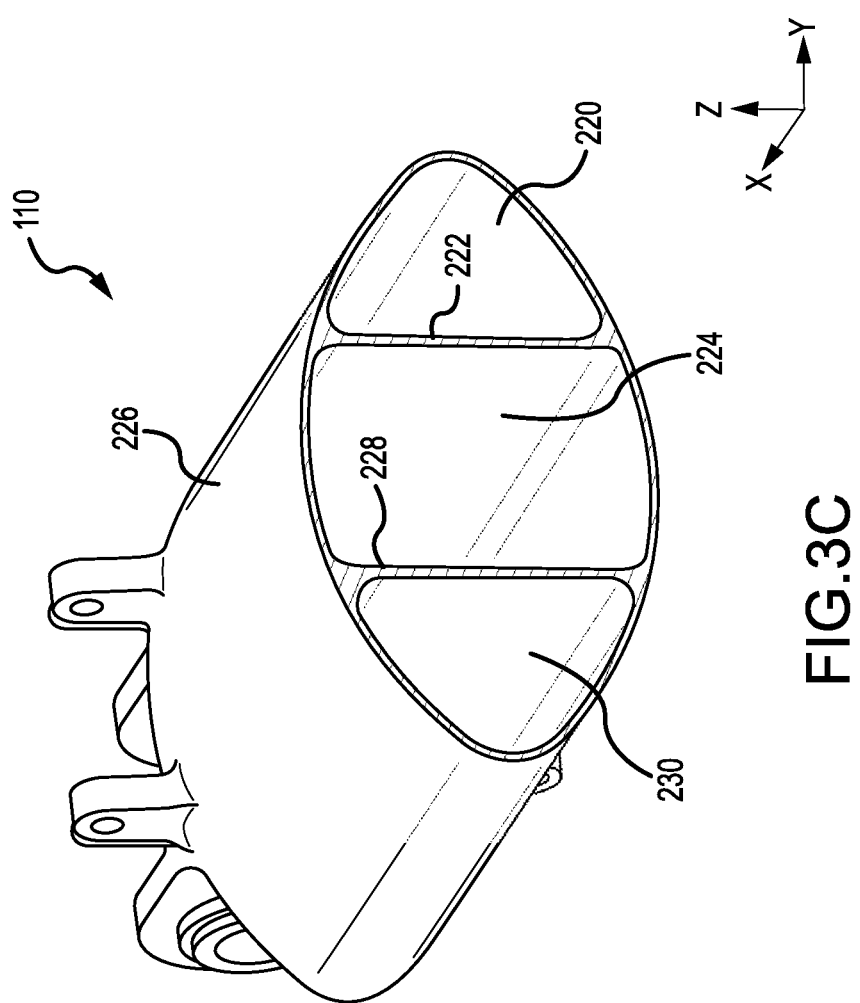
FIG. 3C illustrates a cross-sectional view of the internal cavities of a lower arm, in accordance with various embodiments.

With reference to FIG. 3C, a cross-sectional view of lower arm 110 taken along the y-z plane is shown, in accordance with various embodiments. Internal cavity 230 may have a triangular cross sectional geometry with curved vertices. Similarly, internal cavity 220 may have a triangular cross sectional geometry with curved vertices. The sides of the triangular geometries may be slightly convex along thin skin 226 to improve load distribution. Internal wall 228 and internal wall 222 may be substantially flat. Internal cavity 224 may have a substantially rectangular geometry with the sides along thin skin 226 having a slightly convex geometry to improve load distribution. The outer surface of thin skin 226 may have an elongated, oval-like geometry as viewed in FIG. 3C.

Referring now to FIG. 4A, the thickness of internal wall 236 and internal wall 240 may vary along the length (i.e., in the x direction) of upper arm 112 and the radius of curvature of the surface joining internal wall 236 with thin skin 232, or internal wall 240 with thin skin 232, may vary as well. Curved surface 400 may extend along the length of internal wall 240 and may blend a surface of internal wall 240 into the internal surface of thin skin 232. Curved surface 406 may also run along the length of internal wall 240 and may blend a surface of internal wall 240 into the internal surface of thin skin 232. The curve of the curved surface may include a radial or multi-radial curve, oriented perpendicular to the length of internal wall 240 (i.e., in the y-z plane of FIG. 2A). The radius of curvature may vary at different longitudinal points along the length of upper arm 112.

In various embodiments, curved surface 404 may be symmetric to curved surface 406. Similarly, curved surface 400 may be symmetric to curved surface 402. Curved surface 406 and curved surface 404 may have a radius of curvature ranging from 0.5 inches (12.7 mm) to 0.8 inches (20.3 mm). In various embodiments, the radius of curvature of curved surface 404 and curved surface 406 may be may be shorter near the longitudinal center of upper arm 112 than the radius of curvature near the longitudinal ends of upper arm 112. Curved surface 400 and curved surface 402 may have a substantially uniform curvature of approximately 0.5 inches (12.7 mm), or ranging from 0.5 inches (12.7 mm) to 0.8 inches (20.3 mm).

Figure 4B:
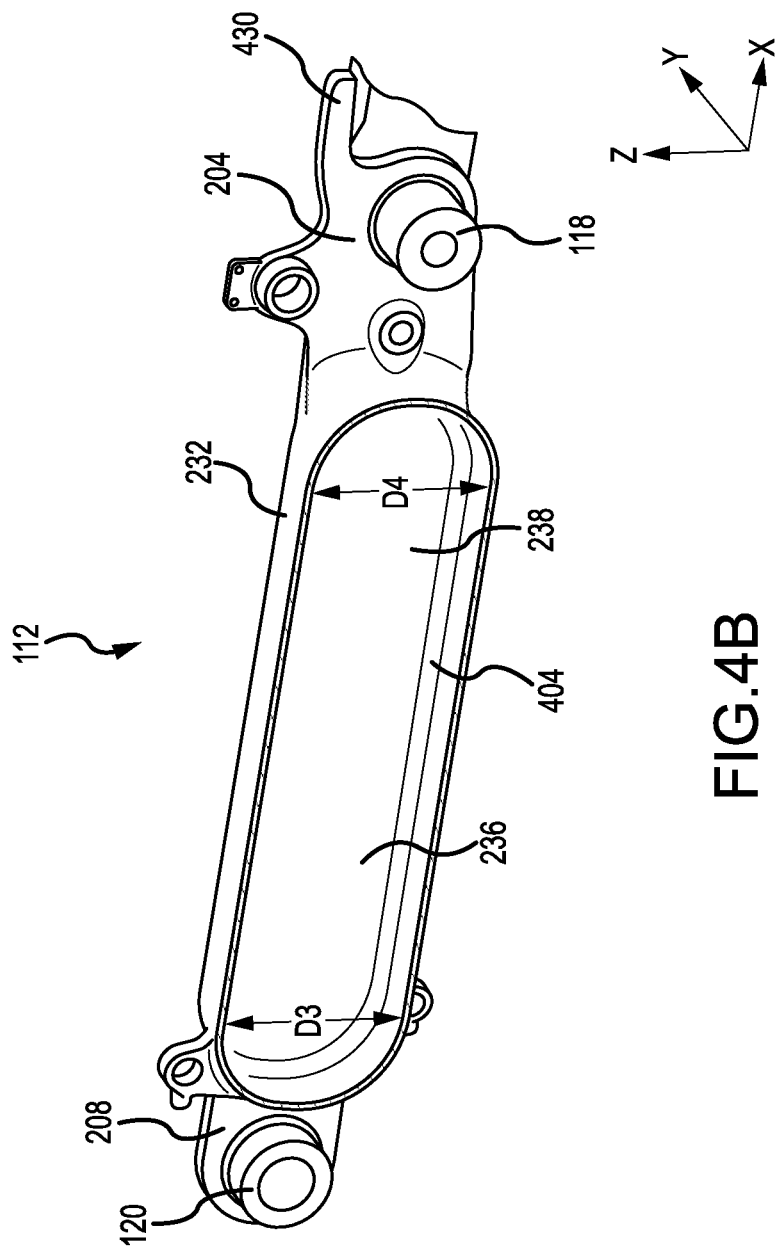
FIG. 4B illustrates a cross sectional view of a central cavity of an upper arm partially defined by internal walls, in accordance with various embodiments.

With reference to FIG. 4B, a cross sectional view of upper arm 112 taken along the x-z plane is shown, in accordance with various embodiments. Upper arm 112 may have a height D3 (in the z direction) proximate joint 120 and lug 208. Upper arm 112 may also have a height D4 (in the z direction) proximate joint 118 and mating flange 204. Mating flange 204 may include an arm 430 configured to contact lower arm 110 in response to pivotal motion and restrict the range of pivotal motion at joint 118. Upper arm 112 and internal cavity 238 may have a tapered height in the longitudinal direction, with D3 greater than D4. In that regard, thin skin 232 may define two non-parallel longitudinal walls when viewed in cross section as shown in FIG. 2B. Curved surface 404 may define a perimeter of internal wall 236.

Figure 4C:
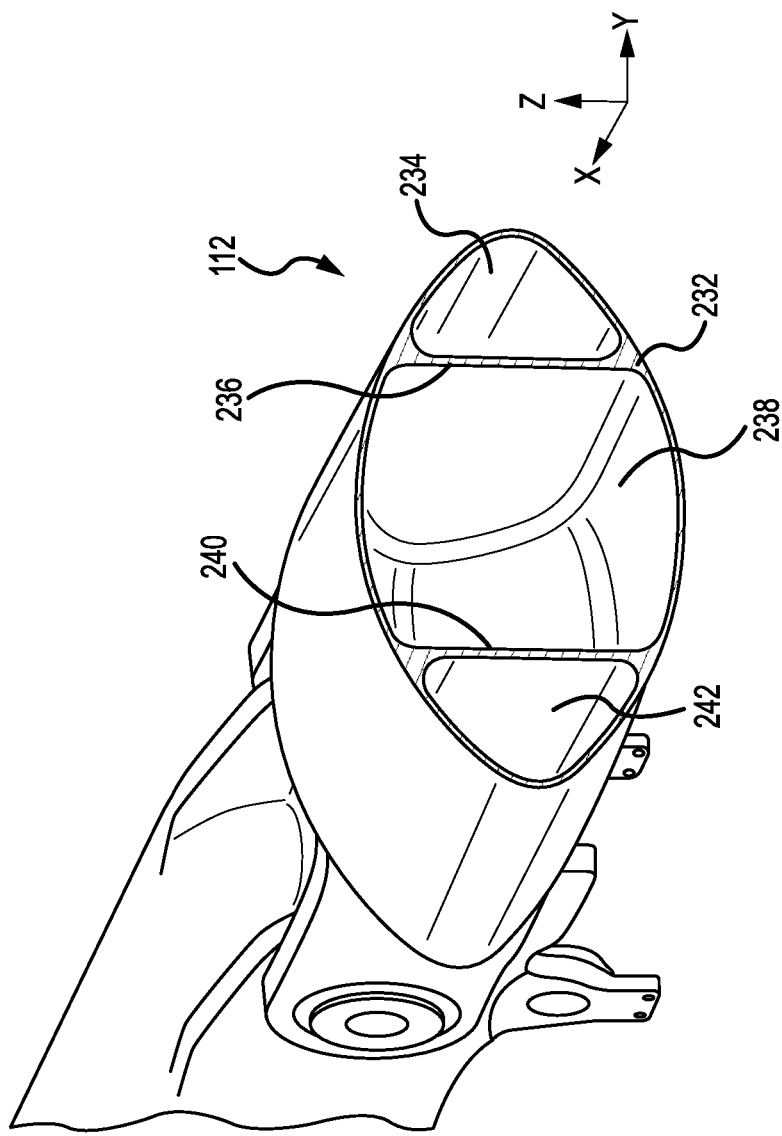
FIG. 4C illustrates a cross-sectional view of the internal cavities of an upper arm, in accordance with various embodiments.

With reference to FIG. 4C, a cross-sectional view of upper arm 112 taken along the y-z plane is shown, in accordance with various embodiments. Internal cavity 242 may have a triangular geometry with curved vertices. Similarly, internal cavity 234 may have a triangular geometry with curved vertices. The sides of the triangular geometries may be slightly convex along thin skin 232 to improve load distribution. Internal wall 240 and internal wall 236 may be substantially flat. Internal cavity 238 may have a substantially rectangular geometry with the sides along thin skin 232 having a slightly convex geometry to improve load distribution. The outer surface of thin skin 232 may have an elongated, oval-like geometry as viewed in FIG. 4C.

Figure 5:
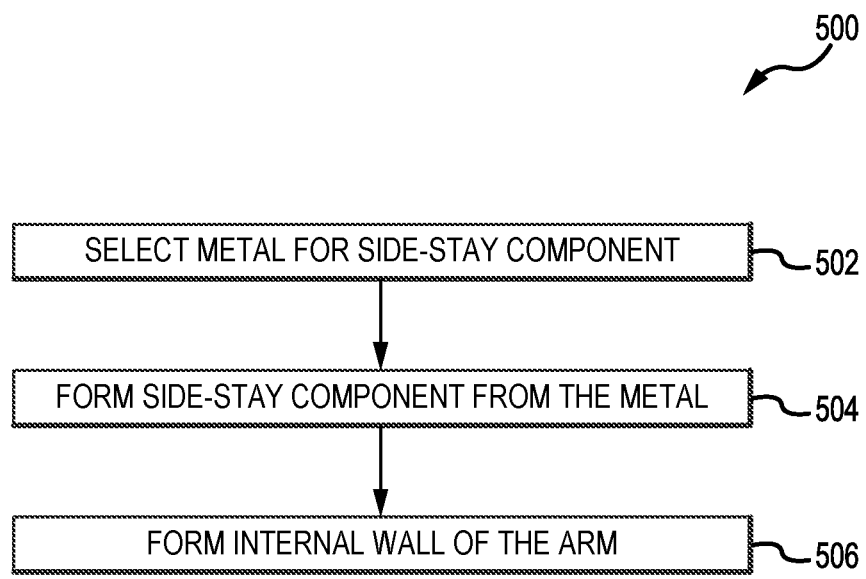
FIG. 5 illustrates a method of making a thin-skin side-stay beam using additive manufacturing techniques such as wire arc additive manufacturing (WAAM) and/or electron beam additive manufacturing (EBAM), in accordance with various embodiments.

With reference to FIG. 5, an exemplary process 500 for making thin skin landing gear components is shown, in accordance with various embodiments. Any of the various embodiments described herein may be made using additive manufacturing techniques such as direct metal laser sintering, selective laser sintering, selective laser melting, electron-beam melting, electron-beam freeform fabrication, electron beam additive manufacturing (EBAM), or wire arc additive manufacturing (WAAM). WAAM and/or EBAM manufacturing may be used to provide advantageous metallurgic properties in the thin-skin side-stay beams disclosed herein. For example, tensile tests performed on rolled WAAM walls found that the properties of rolled WAAM walls were improved over standard rolled walls and became isotropic. The isotropic material may be worked using cold working process to refine the microstructure and improve the related mechanical properties, thereby making the material anisotropic. The thin-skinned side-stay beams described herein may be made using a grade 5 titanium WAAM deposit such as, for example, Ti-6Al-4V. Grade 5 titanium may include 90% titanium, 6% aluminum, up to 0.25% iron, up to 0.2% oxygen, and 4% vanadium. Other titanium alloys may also be used to make thin-skinned side-stay beams using WAAM techniques.

The experimentally evaluated vertical and horizontal tensile properties of WAAM deposited 2319 aluminum alloy and wrought 2219 aluminum alloy are presented in table T1 below. The vertical (V) direction refers to samples taken across the build layers whilst the horizontal (H) direction refers to those taken along the layers. Yield strength (YS), ultimate tensile strength (UST), and elongation of the WAAM alloy are evenly distributed in the whole as-deposited wall. Average YS and UTS are 110 MPa (16.0 ksi) and 260 MPa (37.7 ksi), respectively. Although the strength values are lower than those of the T851-tempered alloy, they are 50% higher than those of the O-tempered alloy. Meanwhile, the 17% plastic elongation is higher than the T-tempered alloy, which may expand industrial application. In addition to the above mentioned improved metallurgic characteristics, the deposit width in WAAM manufacturing may be 3.5 mm (0.14 in) or lower, reducing the presence of excess material. In various embodiments, a WAAM deposited aluminum alloy such as the aluminum alloy described in table T1 may be used to make thin-skin side-stay beams of the present disclosure. The term approximately is used herein to describe a variance of +\−10% of the measured values in the tables below.

TABLE T1

| Tensile properties of WAAM deposited 2319 alloy and wrought 2219 alloy | | | | | | | | |
|---|---|---|---|---|---|---|---|---|
| | WAAM Alloy | | | | | | Wrought Alloy | |
| | V1 | V2 | V3 | H1 | H2 | H3 | 2219-O | 2219-T851 |
| Yield Strength (Mpa) | 105 | 106 | 107 | 112 | 110 | 121 | 76 | 350 |
| Yield Strength (ksi) | 15.2 | 15.4 | 15.5 | 16.2 | 16 | 17.6 | 11 | 50.8 |
| UTS (Mpa) | 257 | 261 | 256 | 262 | 263 | 263 | 172 | 455 |
| UTS(ksi) | 37.3 | 37.9 | 37.1 | 38 | 38.1 | 38.1 | 25 | 66 |
| Elongation (%) | 15.4 | 16.8 | 14.4 | 18.3 | 19 | 17.8 | 18 | 10 |

In various embodiments, WAAM may be used to generate thin-skin side-stay beams with the above advantageous material properties including improved plastic elongation, UTS, and yield strength over the O-tempered counterpart. The improved material properties may enable thin-skin side-stay beams to meet standards for operation with reduced weight, as less material may be used in response to improved material properties. WAAM may also enable high build rates of approximately 20 pounds (9.1 kg) per hour.

Thus, in various embodiments, a thin-skin side-stay beam 102 may be formed by selecting a suitable metal (Step 502). The metal may be an aluminum alloy, a titanium alloy, steel, or another suitable metal. The metal may also be suitable for e-beam additive manufacturing or WAAM techniques. The thin-skin side-stay beams may then be formed from the metal (Step 504). The thin-skin side-stay beams may include a lower arm 110 and/or an upper arm 112 as described above. An internal wall of the arm may also be formed using additive manufacturing (Step 506).

Components made using WAAM may include a grain structure grown in the direction of material being added. The surfaces of the landing gear components made with additive manufacturing may be smooth. Smooth surfaces and joints may refer to non-welded shapes. The landing gear components may also have continuous steps, flanges, and other structures that may be rough when welded. Furthermore, the landing gear components may have internal structural details that cannot be machined into the components due to lack of access.

Surfaces made using WAAM, EBAM, or similar weld-like techniques may deposit material in a series of cylindrical layers formed one on top of another. A wall formed by the techniques may thus have varying width corresponding to the cylindrical profile of each layer. The strength of the wall, however, may be limited by the thin portions of the wall. Thus, the excess material may be removed from each layer during the deposition process. In that regard, forming a thin skin landing gear of the present disclosure using WAAM and/or EBAM manufacturing may also include depositing a layer of material, removing excess material from the layer to give the layer a substantially uniform width, depositing another layer of the layer of uniform width, and removing excess material from the second layer to give the second layer a substantially uniform width. This process would be continued throughout the build of the entire part. In various embodiments of the build process, several layers of material could be deposited, followed by a clean-up process which would remove excess material from the entire wall surface, creating a wall with a substantially uniform width.

Thin-skin side-stay beams of the present disclosure may tend to reduce weight and increase stiffness, as the curved surfaces and elongated geometry of thin-skinned members use less material to achieve acceptable support levels. The thin-skin side-stay beam may also tend to reduce turbulence of air passing by the deployed landing gear with its smooth surfaces and rounded contours. In that regard, thin-skin side-stay beams of the present disclosure may thus tend to minimize noise generated by air rushing past deployed landing gear assemblies. Additionally, the micro structure of the thin-skin side-stay beams may be improved using additive manufacturing techniques.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making an arm for a thin-skin side stay beam, comprising:
    selecting a metal;
    forming a thin skin of the arm from the metal using additive manufacturing, wherein the thin skin is elongated in a longitudinal direction with a first mating flange extending from a first longitudinal end of the thin skin, a second mating flange extending from the first longitudinal end of the thin skin, a first lug extending from a second longitudinal end of the thin skin, and a second lug extending from the second longitudinal end of the thin skin, wherein the first mating flange and the second mating flange are each configured with an opening for receiving at least one of a first pin or a first bushing and wherein the first lug and the second lug are each configured with an opening for receiving at least one of a second pin or a second bushing;
    forming a first internal wall of the arm using additive manufacturing, wherein the first internal wall extends longitudinally within the thin skin, wherein the thin skin and the first internal wall define a first triangular cavity; and
    forming a second internal wall of the arm using additive manufacturing, wherein the second internal wall extends longitudinally within the thin skin, wherein the thin skin, the first internal wall, and the second internal wall define a rectangular cavity, wherein the thin skin and the second internal wall define a second triangular cavity.

2. The method of claim 1, wherein the forming the thin skin of the arm comprises:
    depositing a first layer of the metal;
    removing an excess material from the first layer of the metal; and
    depositing a second layer of the metal over the first layer of the metal.

3. The method of claim 1, wherein the forming the thin skin of the arm comprises:
    depositing a first layer of the metal;
    depositing a second layer of the metal over the first layer of the metal; and
    removing an excess material from the first layer of the metal and the second layer of the metal.

* * * * *